United States Patent
Ihm et al.

(10) Patent No.: US 7,524,367 B2
(45) Date of Patent: Apr. 28, 2009

(54) POLY CROSS LINKED PHTHALOCYANINE COMPOUND FOR SOLAR CELL AND INK COMPOSITION COMPRISING THE SAME

(76) Inventors: Dae Woo Ihm, 51-107, Hanyang Apt., Apgujeong-dong, Gangnam-gu, Seoul (KR); Shi Surk Kim, 107-501, Lakeside, 580, Doekji-ri, Eumbong-myeon, Asan-si, Chungcheongnam-do (KR); Kyung Mi Lee, 121-606, Daewoo Apt., 12/4, 176, Cheongcheon-dong, Bupyeong-gu, Incheon (KR); Byung Sun Cho, 101, Ga-dong, Yuseong Villa, 6/2, 272, Gajeong-dong, Seo-gu, Incheon (KR)

( * ) Notice: Subject to any disclaimer, the term of this patent is extended or adjusted under 35 U.S.C. 154(b) by 0 days.

(21) Appl. No.: 11/957,320

(22) Filed: Dec. 14, 2007

(65) Prior Publication Data

US 2009/0076192 A1    Mar. 19, 2009

(30) Foreign Application Priority Data

Aug. 21, 2007   (KR) .................. 10-2007-0084192

(51) Int. Cl.
- C09D 11/02   (2006.01)
- C08G 73/00   (2006.01)
- C07D 487/22  (2006.01)
- C09B 47/04   (2006.01)
- C09B 62/00   (2006.01)

(52) U.S. Cl. ................. 106/31.49; 106/31.78; 528/422; 540/122; 540/139; 540/140

(58) Field of Classification Search ............. 106/31.49, 106/31.78; 528/422; 540/122, 139, 140
See application file for complete search history.

(56) References Cited

U.S. PATENT DOCUMENTS

| | | | | |
|---|---|---|---|---|
| 4,223,123 A | * | 9/1980 | Keller et al. | 528/210 |
| 4,311,775 A | * | 1/1982 | Regan | 430/37 |
| 4,943,681 A | * | 7/1990 | Sato et al. | 540/140 |
| 5,456,998 A | * | 10/1995 | Burt et al. | 430/58.8 |
| 5,675,001 A | * | 10/1997 | Hoffman et al. | 540/139 |
| 7,163,772 B2 | * | 1/2007 | Yamasaki et al. | 540/139 |
| 2004/0146793 A1 | * | 7/2004 | Yamasaki et al. | 430/59.4 |
| 2008/0184909 A1 | * | 8/2008 | Kim et al. | 106/31.13 |

FOREIGN PATENT DOCUMENTS

WO   WO 2007/013732   *   2/2007

* cited by examiner

*Primary Examiner*—Helene Klemanski
(74) *Attorney, Agent, or Firm*—Frank Liebenow; Larson & Larson, P.A.

(57) ABSTRACT

A poly cross linked phthalocyanine compound for a solar cell and ink composition comprising the same, and more particularly a poly cross linked phthalocyanine compound effective for use in a near infrared absorbent having a high absorption power in a near infrared wavelength from about 750 nm to about 1100 nm, wherein the poly cross linked phthalocyanine compound having structures according to the present inventive concept is sensitized to infrared region, although ruthenium-based compound used for existing dye-sensitized solar cells is sensitized to visible light region, such that the compound according to the present novel concept can be extended in wavelengths for use in solar cells to improve an energy conversion efficiency.

6 Claims, 5 Drawing Sheets

POLY CROSS LINKED PHTHALOCYANINE COMPOUND FOR SOLAR CELL AND INK COMPOSITION COMPRISING THE SAME

BACKGROUND OF THE INVENTION

1. Field of the Invention

The following description relates generally to poly cross linked phthalocyanine compound for solar cell and ink composition comprising the same, and more particularly to poly cross linked phthalocyanine compound beneficial for use in a near infrared absorbent having a high absorption power in a near infrared wavelength from about 750 nm to about 1,100 nm.

2. Description of the Prior Art

Conventional solar cells convert light into electricity by exploiting the photovoltaic effect that exists at semiconductor junctions. In other words, the commercial solar cells absorb energy from visible light and converts excited charge carriers thereof to electric energy. At present, the main commercial solar cells are silicon-based solar cells. For a silicon-based solar cell, there are shortcomings in that high energy costs for material processing is required and many problems to be addressed such as environmental burdens and cost and material supply limitations are involved. For an amorphous silicon solar cell, there are also shortcomings in that energy conversion efficiency decreases when used for a long time due to deterioration in a short period.

Recently, many attempts have been undertaken to develop low-cost organic solar cells, whereby development of one particular type of solar cell which is a dye-sensitized solar cell (DSSC) is accelerated that generally uses an organic dye to absorb incoming light to produce excited electrons.

The dye-sensitized solar cells have advantages over silicon-based solar cells in terms of simplified processing steps, low fabrication cost, transparency and pleochroism. The dye-sensitized solar cells can be fabricated from flexible substrates to function as cells of mobility and portability.

The dye-sensitized solar cells have lower energy (photoelectric) conversion efficiency over that of the silicon-based solar cells such that a wide range of researches are briskly under way to enhance the energy conversion efficiency. In order to improve the energy conversion efficiency, extension of wave length up to infrared regions is being waged with great concern. It is known that the energy bandgap (eV) for use in solar cells must exceed 1.4 eV (electron volt).

Meanwhile, phthalocyanine compound used as a dye in electrodes for solar cells has advantages such as high transmittivity relative to visible light, excellent selective absorption power in the near infrared region, high heat resistance, high weatherability and high thermotolerance, so that the phthalocyanine compound has a wide range of applications including ink and fields where a predetermined wave length is absorbed or interrupted.

A variety of technologies involving the phthalocyanine compound has been disclosed. For example, phthalocyanine compound and manufacturing method thereof are described in Korea Patent Laid-Open Publication No. 10-528155, the phthalocyanine compound being expressed in the following Formula 1,

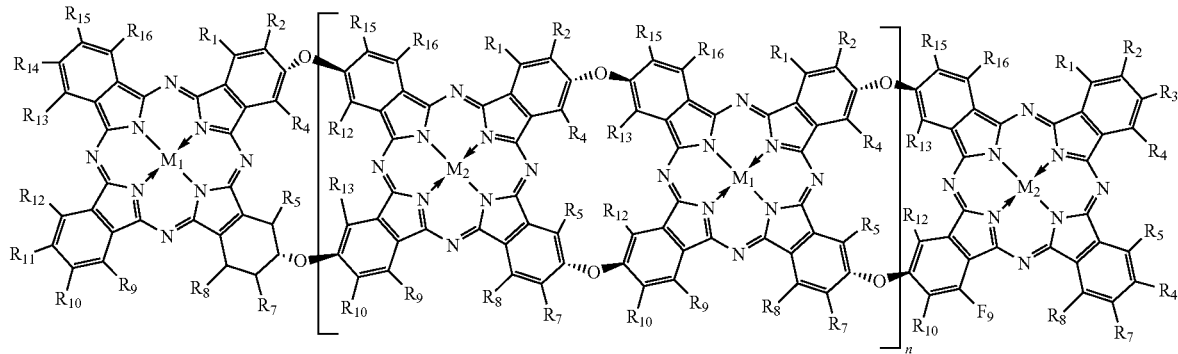

where, $M_1$ and $M_2$ independently represent selections from non-metals, metals, metal oxides, and metal halides and may be same or different each other. $R_1$ to $R_{16}$ respectively represent a hydrogen atom, a halogen atom, a hydroxyl, an amino group, a hydroxysulfonyl group, an aminosulfonyl group, an alkyl group, an alkyl group which may have substituents of a 1~20 carbon numbers, SR17, SR18, OR19, NHR20 or NHR21, selections which may be respectively the same or different, and where, R17 is a phenyl group which may have substituents, an alkyl group or a 1~20C alkyl group, R18 is a phenyl group which may have a 1~20C alkoxy group, R19, R20 are respectively a phenyl group which may have a substituent, an arylalkyl group or a 1~20C alkyl group, R21 is a 1~20C alkyl group which may have a substituent, and n is an integer of 0~3.

The phthalocyanine compound having a structure of the afore-mentioned Formula 1 which has a phthalic anhydride and a urea, a metal salt or a metal chloride may interrupt an inflow of oxygen, and may be obtained by reaction at a high temperature using solvent of a high boiling point.

In this regard, it is therefore desirable to keep working on the compound showing an absorption power at a wider scope of a near infrared region.

SUMMARY

Aspects of the present disclosure provide phthalocyanine compound beneficial for use as a near infrared absorbent having a high absorption power in a near infrared wavelength from about 750 nm to about 1,100 nm, and as a charge generating material having a variety of advantages such as light sensitivity and electrical characteristics.

It is therefore an object of the present novel concept to provide a poly cross linked phthalocyanine compound beneficial for use in a dye (photosensitizer) sensitized solar cell capable of being extensively sensitized to a near infrared region from the visible light region, and particularly to a poly cross linked phthalocyanine compound beneficial for use in a dye sensitized solar cell as a sensitizer.

In one general aspect, a poly cross linked phthalocyanine compound for use in solar cell has a structure expressed in the following Formula 2,

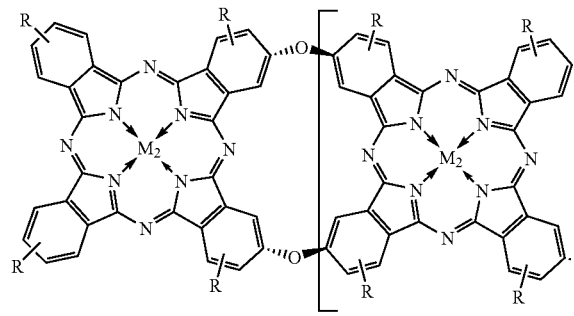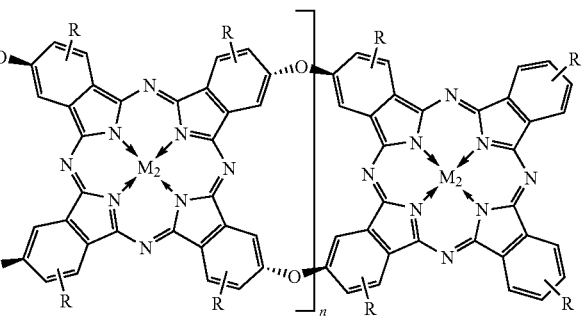

where, $M_1$ and $M_2$ respectively represent selections from metals, metal oxides, and metal halides and may be same or different each other. R represents a hydrogen atom, a halogen atom, a hydroxyl, a carboxyl group, an amino group, a hydroxysulfonyl group, an aminosulfonyl group, an alkyl group or alkyl group which has substituents of 1~20 carbon numbers, and n is an integer of 0~3.

In another general aspect, an ink composition including a near infrared absorbent for solar cell is provided, wherein the near infrared absorbent comprises poly cross linked phthalocyanine compound having a structure expressed in the aforementioned Formula 2.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION OF THE PREFERRED EMBODIMENT

Figure 1:
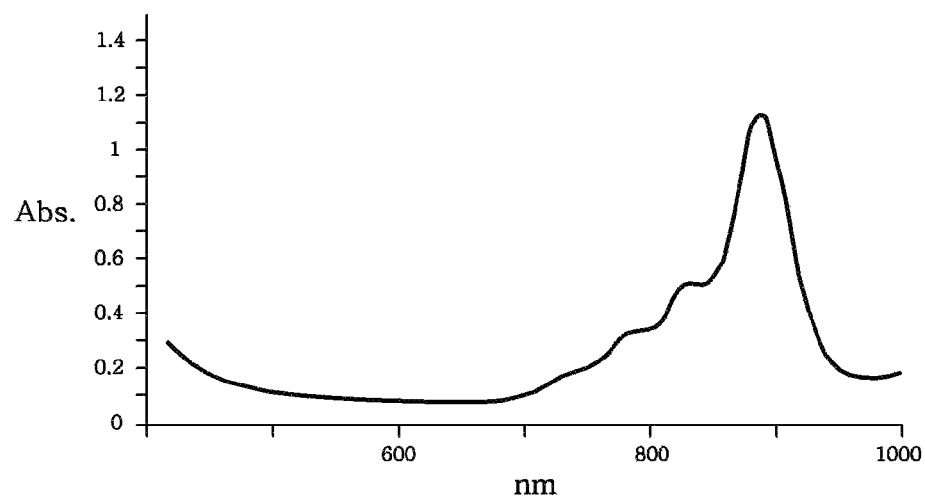
FIGS. 1 and 2 are graphs illustrating infrared absorption wavelength and reflectivity of poly cross linked dysprosium phthalocyanine compound.

The present novel concept will become more fully understood from the detailed description given herein below.

The Poly cross linked phthalocyanine compound has a structure expressed in the aforementioned Formula 2. Although ruthenium-based compound used for existing dye-sensitized solar cells may be sensitized to visible light region, the poly cross linked phthalocyanine compound having the above-mentioned structure may be sensitized to infrared region. Hence, the compound having the structure of aforementioned Formula 2 is extended in wavelengths for use in solar cells with improved energy conversion efficiency.

Furthermore, the poly cross linked phthalocyanine compound having the above-mentioned structure may be used as a superb near infrared absorbent because of have not only a high absorption power in a wide range of near infrared wavelength but also having excellent characteristics in i.e., light resistance, heat resistance, weatherability and chemical resistance. Particularly, the poly cross linked phthalocyanine compound having the cross-linking structure can change wavelengths of the existing phthalocyanine compound to have a feature of absorbing wavelengths of higher and wider near infrared region.

The change may be easily ascertained by an analytical result of photoelectric spectrophotometer, where although the conventionally commercialized phthalocyanine shows an optical density at about 670 nm the poly cross linked phthalocyanine compound according to the present novel concept represents an optical density at a near infrared wavelength of 750~1100 nm. Besides, although the conventionally commercialized phthalocyanine compound having a structure of above-said Formula 1 shows a peak optical density (absorbance) in 840 nm or 890 nm, the poly cross linked phthalocyanine compound according to the present novel concept has a characteristic of a maximum optical density in the range of 900 nm~920 nm.

The metals that may be applicable to $M_1$ and $M_2$ of the Formula 2 may be selectively used from a group consisting of lithium, beryllium, sodium, magnesium, aluminum, potassium, calcium, scandium, titanium, vanadium, chromium, manganese, iron, cobalt, nickel, copper, zinc, germanium, yttrium, zirconium, niobium, molybdenum, technetium, ruthenium, rhodium, palladium, silver, cadmium, indium, tin, antimony, barium, lanthanum, cesium, praseodymium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, actinium, protactinium, uranium, neptunium and americium.

An anticipated theoretical energy band gap and an applicability therefrom is given in the following Table 1 based on a peak transmission wavelength of representative poly cross metal phthalocyanine among the above-listed metals.

TABLE 1

Energy Band Gap Theoretical Value And Applicability According To Kinds Of Metals

| No. | M | $\lambda_{trans.}$ (nm) | Energy bandgap Theoretical value | Applicability |
|---|---|---|---|---|
| 1 | Non-metal | — | — | |
| 2 | Al | 860 | 1.48 | Applicable |
| | Al, —(COOH) | 720 | 1.77 | |
| 3 | Na | 920 | 1.39 | — |
| 4 | VO | 880 | 1.45 | Applicable |
| 5 | Dy | 900 | 1.42 | Applicable |
| 6 | Gd | 920 | 1.39 | — |
| 7 | Cs | 880 | 1.45 | Applicable |
| 8 | Mn | 840, 1120 | 1.52, 1.14 | Applicable |
| 9 | Mg | 700, 880 | 1.83, 1.45 | Applicable |
| 10 | Sn | 760 | 1.68 | Applicable |
| | Sn, —(COOH) | 900 | 1.42 | |

TABLE 1-continued

Energy Band Gap Theoretical Value And Applicability According To Kinds Of Metals

| No. | M | $\lambda_{trans.}$ (nm) | Energy bandgap Theoretical value | Applicability |
|---|---|---|---|---|
| 11 | Ni | 700 | 1.83 | Applicable |
| 12 | Cu | 720 | 1.77 | Applicable |
| 13 | Ru | 700 | 1.83 | Applicable |

Applicability may be expected from the Table 1 according to the metals of poly cross linked phthalocyanine compound, and $M_1$ and $M_2$ in the compound of Formula 2 may be preferably selected from a group consisting of nickel, tin, aluminum, magnesium, cesium, gadolinium and dysprosium. More preferably, $M_1$ and $M_2$ in the compound of Formula 2 may be respectively dysprosium, and R in the compound of Formula 2 may be hydrogen, which is represented by the following Formula 3,

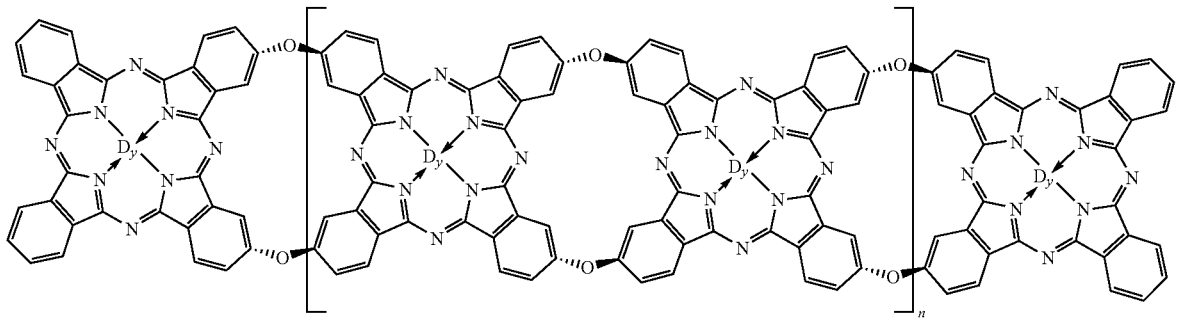

where, n is an integer of 0~3;

or $M_1$ and $M_2$ respectively may be gadolinium, and R may be hydrogen, which is represented by the following Formula 4,

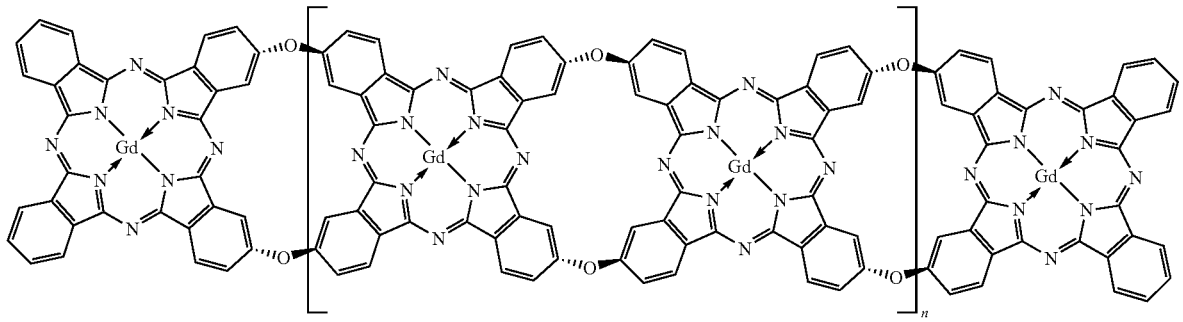

where, n is an integer of 0~3.

More preferably, $M_1$ and $M_2$ may be respectively tin and R may be carboxyl group, which is represented by the following Formula 5,

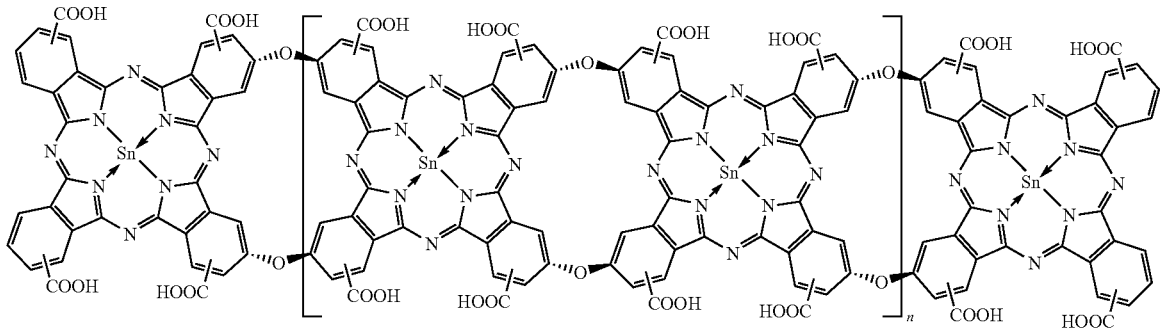

where, n is an integer of 0~3.

Now, fabrication method of poly cross linked phthalocyanine compound of Formula 2 may be explained as below. For example, phthalic anhydride having a structure of the following Formula 6, urea, metal salt or metal chloride, solvent of high boiling point and initiator are mixed at a room temperature, heat refluxed to 230~250° C., reacted for 6~8 hours, a temperature of 70~100° C. maintained, filtered, and respectively washed with dilute solution and alkaline solution at 65~70° C. to obtain a cake removed of non-reacted material.

The cake thus obtained is dispersed in 5 wt % ethylene glycol aqueous solution to be 5~10 w/w %, with temperature of 80~120° C. maintained, heat treated for 2 hours and filtered, which is re-dispersed respectively in acetone and toluene, refined using a soxhlet extraction apparatus at 45~175° C., and dried to easily obtain the poly cross linked phthalocyanine compound of formula 6,

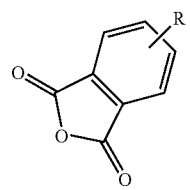

where, R is a hydrogen atom, a halogen atom, hydroxyl group, an amino group, a hydroxysulfonyl group, an aminosulfonyl group, an alkyl group or an alkyl group which has substituents of a 1~20 carbon numbers.

The phthalic anhydride represented in Formula 6 has a decreased reaction force when mixed with moisture, such that a good storage is needed to keep dryness and prevent inflow of moisture, the urea may be a general product, and the reactant solvent of low polarity but with a high boiling point may be selected from a group consisting of α-methylnaphthalene, α-chloronaphthalene, dichlorobenzene, DMF, n-alkylbenzene or ethylene glycol.

The poly cross linked phthalocyanine compound thus fabricated has a characteristic of a high absorption power in a near infrared wavelength from about 750 nm to about 1,100 nm. Accordingly, the poly cross linked phthalocyanine compound as a dye for solar cell may be effectively used sensitizing the Infrared region. Particularly, the poly cross linked phthalocyanine compound may be effectively used as a sensitizer for solar cell.

Hence, the present novel concept provides an ink including the poly cross linked phthalocyanine compound having the afore-mentioned structure wherein the poly cross linked phthalocyanine compound functions as the near infrared absorbent. Particularly, the poly cross linked phthalocyanine compound may exhibit excellent performances if included in ink as the poly cross linked phthalocyanine compound is excellent in light resistance, heat resistance, weatherability and chemical resistance, good in mixability with other components of ink, and less in frictional loss and abrasiveness to thereby enable to produce a sufficient effect even with less amount compared with the existing mineral infrared absorbent.

The poly cross linked phthalocyanine compound has a characteristic of a high absorption power in a near infrared wavelength from about 750 nm to about 1,100 nm, and particularly the poly cross linked phthalocyanine compound has a characteristic of a peak optical density in a near infrared wavelength of 900 nm to 920 nm, such that, particularly, the poly cross linked phthalocyanine compound may be effectively used in documents for fraudulent use prevention, reproduction prevention, counterfeit and forgery prevention. At this time, the ink composition may be for conventional dye type inkjet ink, conventional pigment type inkjet, or screen print type ink, and it should be apparent that the poly cross linked phthalocyanine compound may be used for a variety of inks.

Other exemplary implementations will hereinafter be described in detail with reference to the accompanying drawings.

The phthalocyanine compound may be effectively used as a near infrared absorbent having a high absorption power in a wide near infrared wavelength of 750~1100 nm, and as a charge generating material having a variety of advantages such as light sensitivity and electrical characteristics.

In other words, the poly cross linked phthalocyanine compound may be provided for use in a dye (photosensitizer) sensitized solar cell capable of being extensively sensitized to a near infrared region from the visible light region, and particularly the poly cross linked phthalocyanine compound may be beneficial for use in a dye sensitized solar cell as a sensitizer.

First Exemplary Implementation

Composition of Poly Cross Linked Dysprosium Phthalocyanine 148 parts by weight of phthalic anhydride, 425 parts by weight of urea, 150 parts by weight of dysprosium salt 6 hydrate, 30 parts by weight of dysprosium anhydride salt, 1.8 parts by weight of molybdenum ammonium salt, 1,500 parts by weight of alkylbenzene were mixed, fully agitated, heated up to 200° C. for 4 hours and reacted for 3 hours. Nitrogen gas was flushed out at a speed of 300 ml/min during reaction. Thereafter, the reaction solution was filtered by 500 parts by weight of 10% HCl solution and 500 parts by weight of 10% sodium hydroxide alkali solution and washed several times with water. The reaction solution was dried at 80° C. in a drier until completely arriving at constant, and the dried was dispersed in ethylene glycol solution of 10 wt % to 10 w/w %, treated at 80° C. for an hour, filtered, washed two times in 500 ml of water at 100° C. and dried for 24 hours at 80° C. The solution was put into 300 parts by weight of acetone, refined using a soxhlet extraction apparatus, dried, put into 300 parts by weight of toluene, refined using the soxhlet extraction apparatus, and dried.

Figure 2:
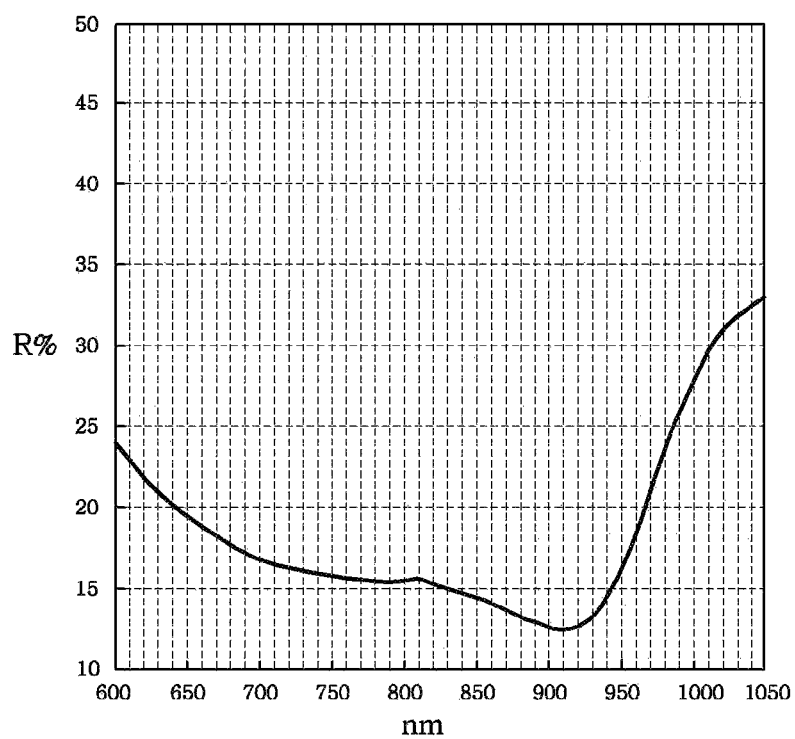
Figure 3:
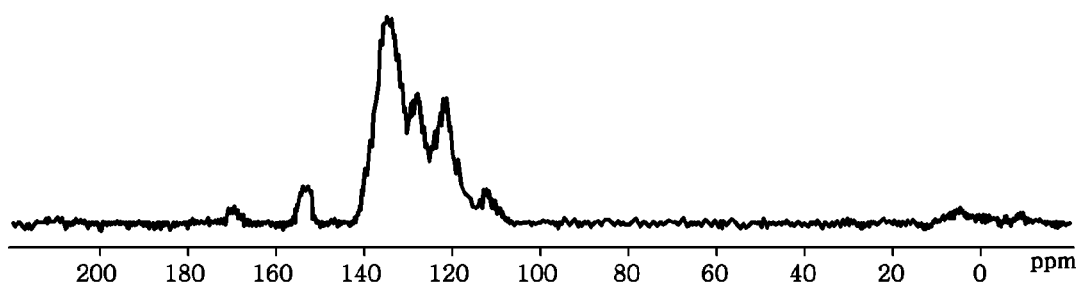
FIGS. 3 and 4 are graphs illustrating $^{13}$NMR and FT-IR spectrum of poly cross linked dysprosium phthalocyanine compound.
Figure 4:
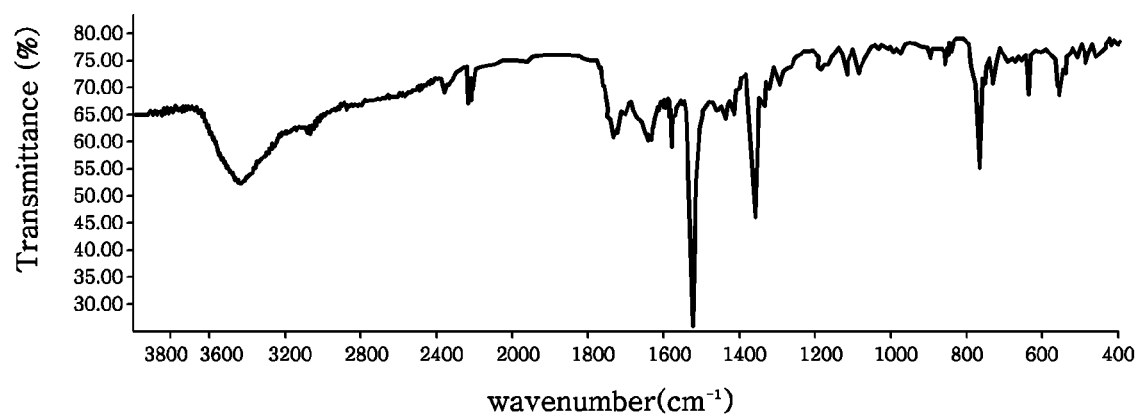

Infrared absorption wavelength and reflectivity of the compound thus obtained are respectively illustrated in FIGS. 1 and 2. At the same time, $^{13}$NMR and FT-IR spectrums are respectively depicted in FIGS. 3 and 4. Furthermore, absorbance data measured by a UV-Visible spectrophotometer is illustrated in Table 2, and element analysis result is shown in Table 3.

The material obtained as a result of the above preparation was ascertained as the poly cross linked phthalocyanine compound having a structure of Formula 3 shown below.

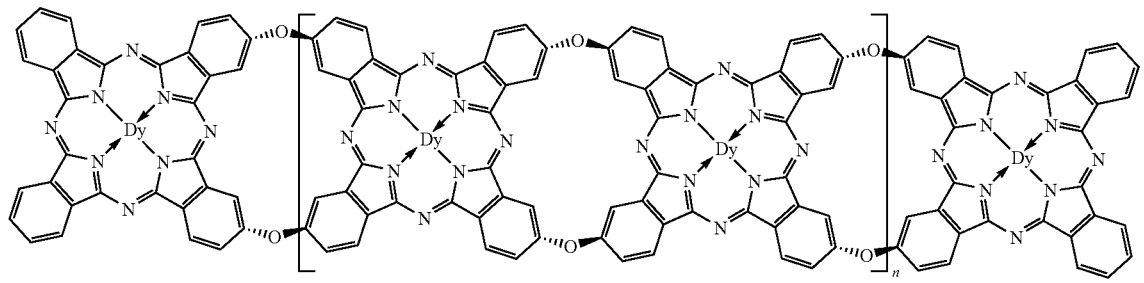

Second Exemplary Implementation

Composition of Poly Cross Linked Gadolinium Phthalocyanine 148 parts by weight of phthalic anhydride, 425 parts by weight of urea, 148 parts by weight of gadolinium 6 hydrate, 20 parts by weight of gadolinium anhydrate salt, 1.8 parts by weight of molybdenum ammonium salt, 1,500 parts by weight of alkylbenzene were mixed, fully agitated, heated up to 200° C. for 4 hours and reacted for 3 hours. Nitrogen gas was flushed out at a speed of 300 ml/min during reaction. Thereafter, the reaction solution was filtered by 500 parts by weight of 10% HCl solution and 500 parts by weight of 10% sodium hydroxide alkali solution and washed several times with water. The reaction solution was dried at 80° C. in a drier until completely arriving at constant, and the dried was dispersed in ethylene glycol solution of 10 wt % to 10 w/w %, treated at 80° C. for an hour, filtered, washed two times in 500 ml of water at 100° C. and dried for 24 hours at 80° C. The solution was put into 300 parts by weight of acetone, refined using a soxhlet extraction apparatus, dried, put into 300 parts by weight of toluene, refined using the soxhlet extraction apparatus, and dried.

Figure 5:
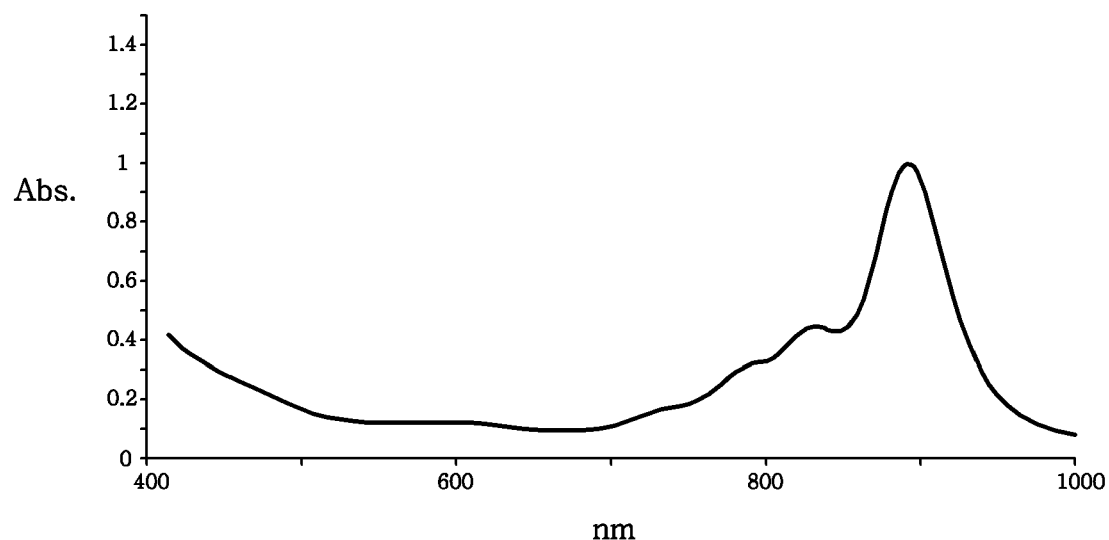
FIGS. 5 and 6 are graphs illustrating infrared absorption wavelength and reflectivity of poly cross linked gadolinium phthalocyanine compound.
Figure 6:
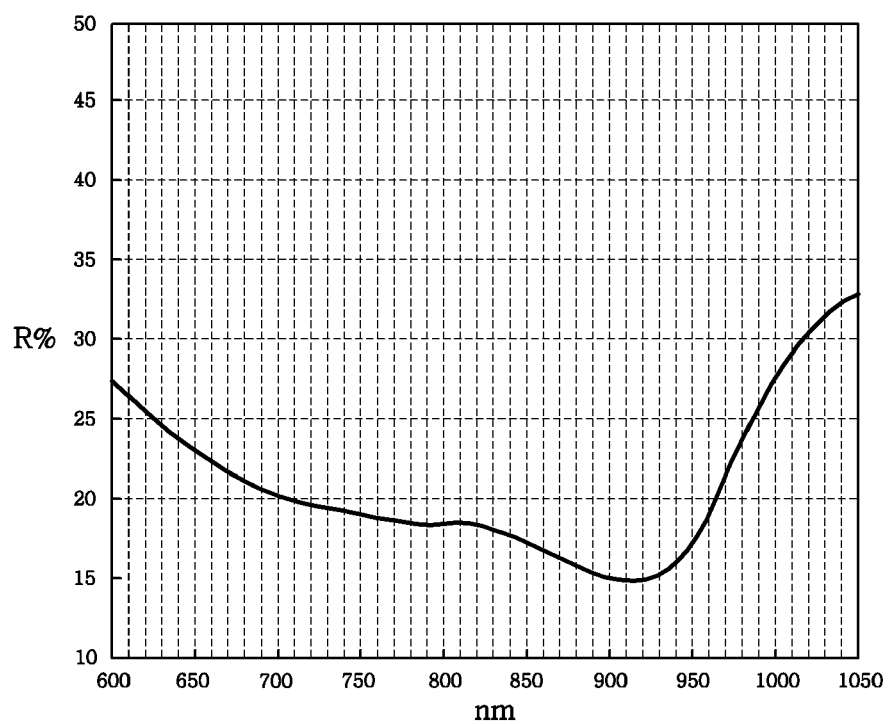

Infrared absorption wavelength and reflectivity of the compound thus obtained are respectively illustrated in FIGS. 5 and 6. Furthermore, absorbance data measured by a UV-Visible spectrophotometer is illustrated in Table 2, and element analysis result is shown in Table 3.

The material obtained as a result of the above preparation was ascertained as the poly cross linked phthalocyanine compound having a structure of Formula 4 below.

First Comparative Example

Composition of Magnesium Phthalocyanine Compound

Figure 7:
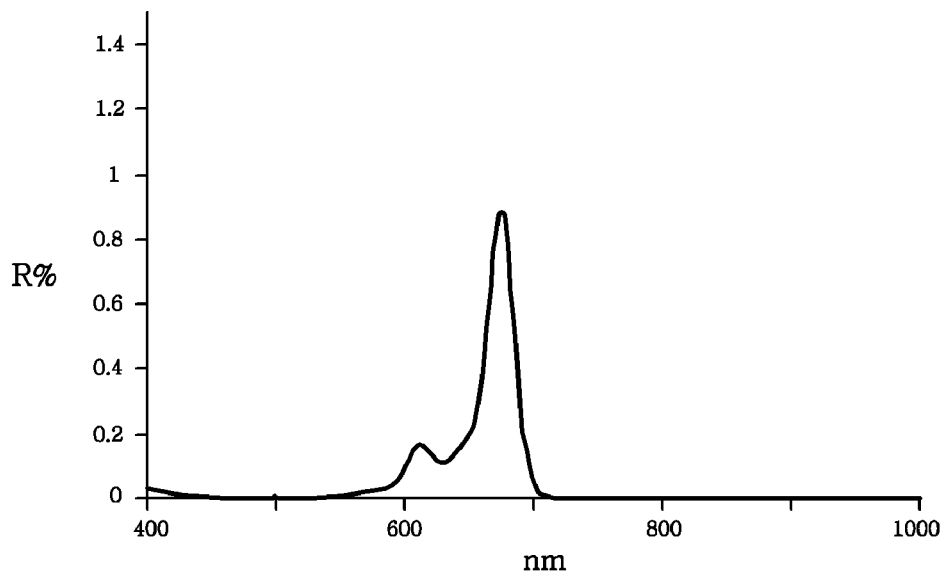
FIGS. 7 and 8 are graphs illustrating infrared absorption wavelength and reflectivity of poly cross linked magnesium phthalocyanine compound.
Figure 8:
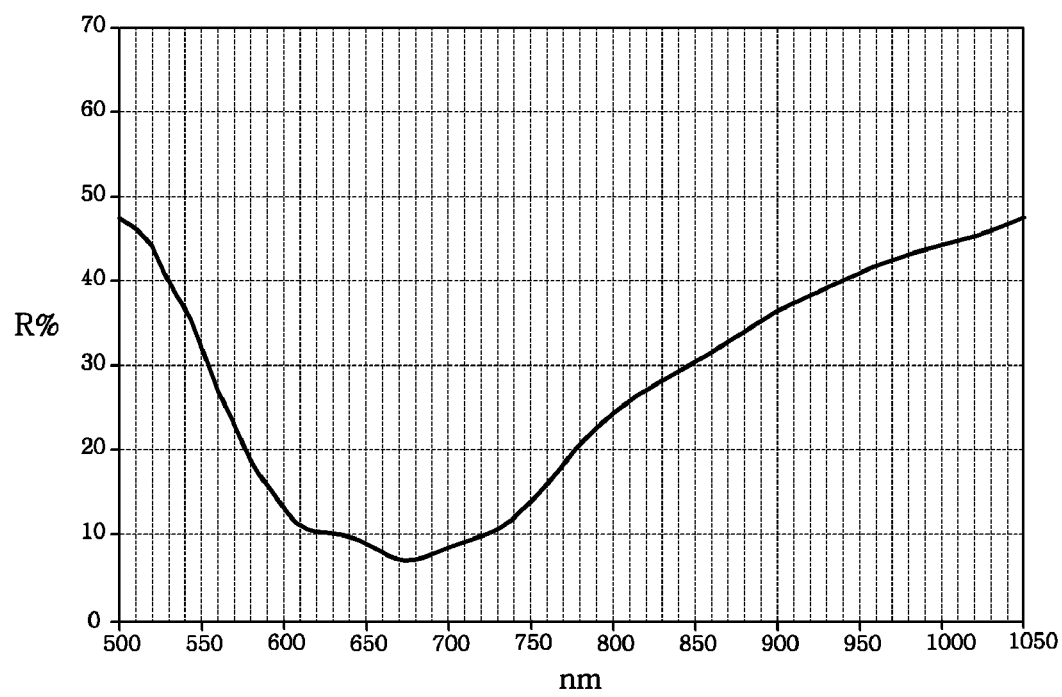
Figure 9:
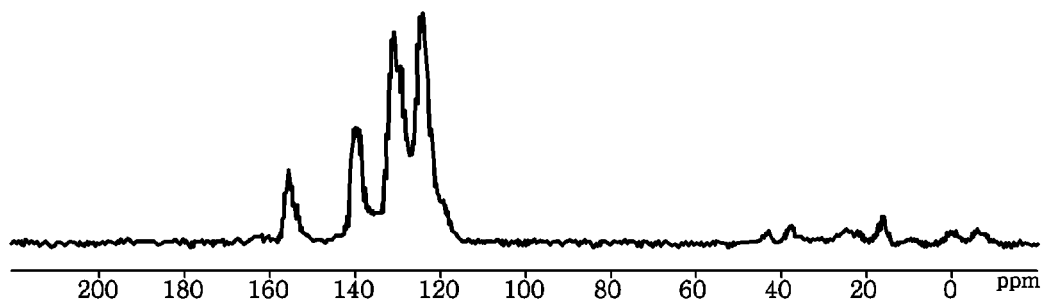
FIGS. 9 and 10 are graphs illustrating $^{13}$NMR and FT-IR spectrums of poly cross linked magnesium phthalocyanine compound.
Figure 10:
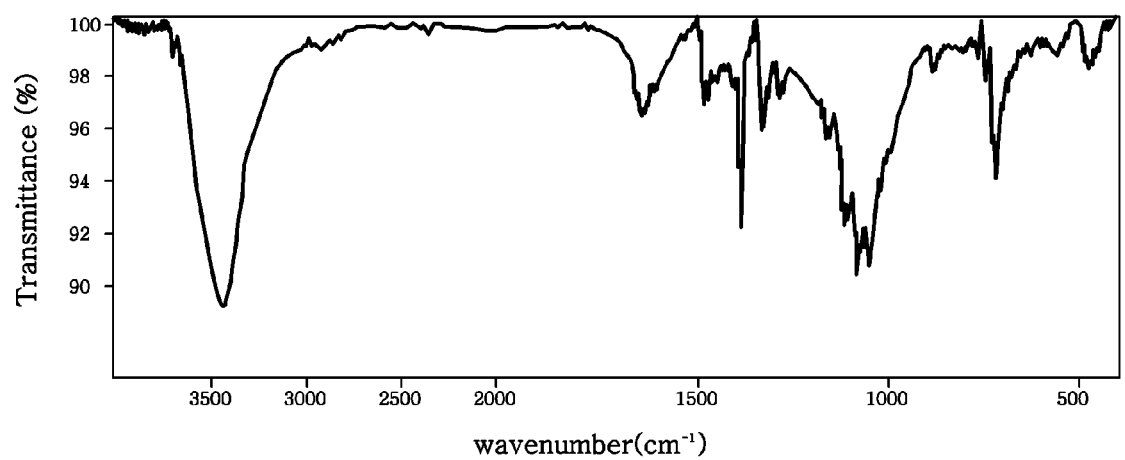

Infrared absorption wavelength and reflectivity of magnesium phthalocyanine compound having the structure of Formula 7 are shown in FIGS. 7 and 8, and $^{13}$NMR and FT-IR spectrums are respectively depicted in FIGS. 9 and 10. Furthermore, absorbance data measured by a UV-Visible spectrophotometer is illustrated in Table 2.

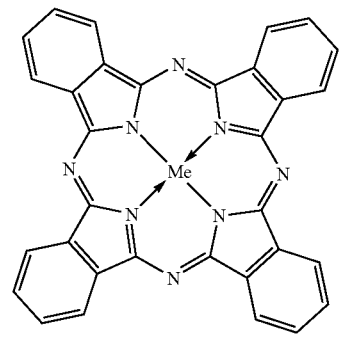

TABLE 2

| | Optical Density Data | |
|---|---|---|
| Classification | central metals ($M_1$, $M_2$) | Peak optical density |
| First exemplary Implementation | Dy, Dy | 900 |
| Second exemplary Implementation | Gd, Gd | 920 |

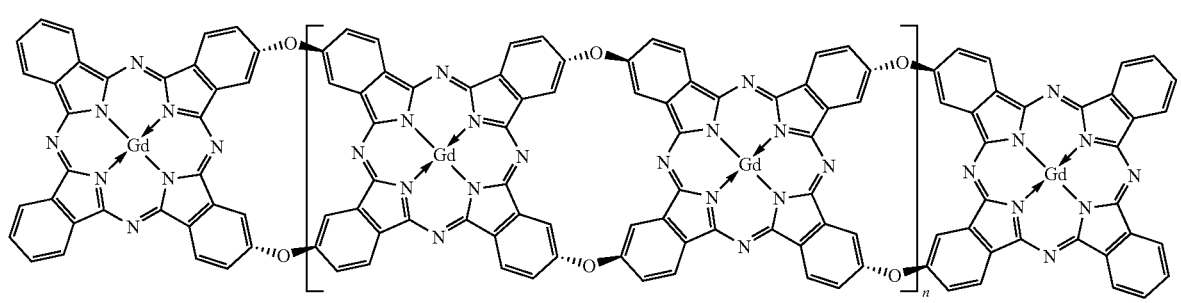

TABLE 2-continued

Optical Density Data

| Classification | central metals ($M_1$, $M_2$) | Peak optical density |
|---|---|---|
| First Comparative Example | Mg | 676 |

TABLE 3

Element Analysis Result

| Classification | Molecular amount | N | C | H | O | Metal |
|---|---|---|---|---|---|---|
| First exemplary Implementation | 4190.0 | 55.09 | 1.9 | 16.02 | 3.8 | 23.19 |
| Second exemplary Implementation | 4158.3 | 55.5 | 1.88 | 16.14 | 3.88 | 22.6 |

FIGS. 1-4, including Tables 2 and 3, are data for assistance in ascertaining the structure of the poly cross linked phthalocyanine compound fabricated according to the first and second exemplary implementations. Particularly, as evidenced from Table 2, it is apparent that the poly cross linked phthalocyanine compound according to the instant novel concept has a peak optical density in the range of 900 nm-920 nm, and has a higher absorption power over the magnesium phthalocyanine compound of the first comparative example to thereby enable to absorb the near infrared wavelengths.

While this invention has been described in connection with what is presently considered to be practical exemplary embodiments, it is to be understood by one skilled in the art that the invention is not limited to the disclosed embodiments, but, on the contrary, is intended to cover various modifications and equivalent arrangements included within the spirit and scope of the appended claims.

The present inventive concept can provide the poly cross linked phthalocyanine compound capable of improving the energy conversion efficiency that can be effectively used in solar cells.

What is claimed:

1. A poly cross linked phthalocyanine compound in a solar cell, the compound having a formula comprising:

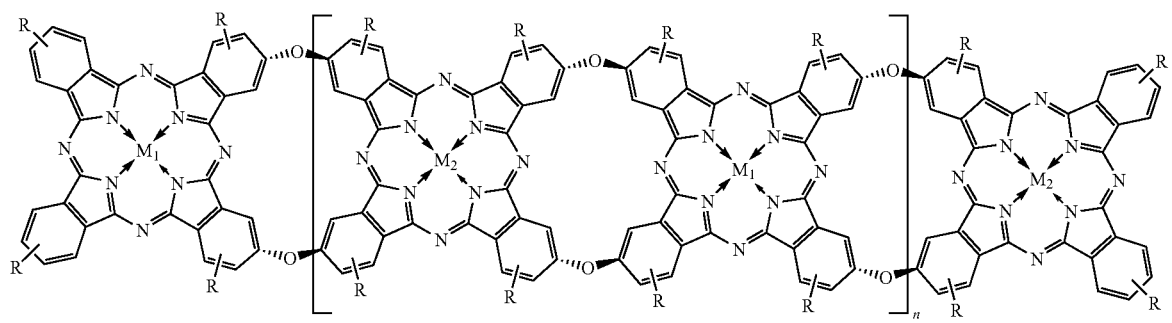

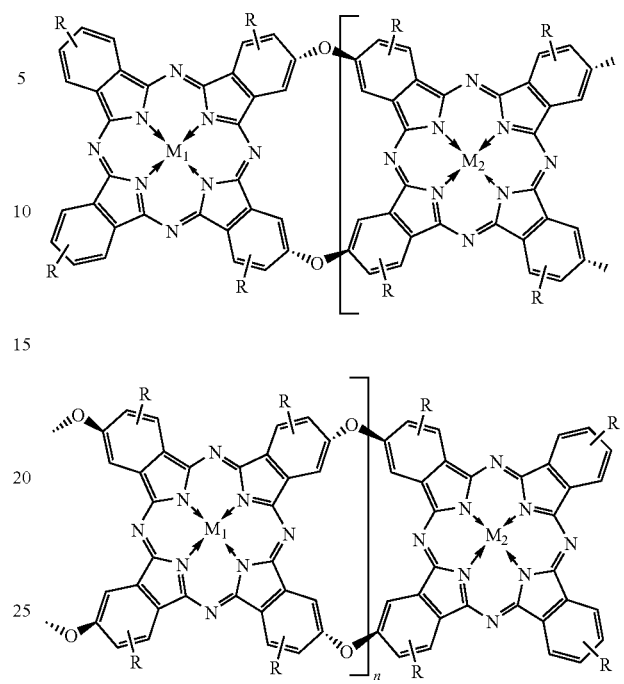

where $M_1$ and $M_2$ are selected from the group consisting of metals, metal oxides, and metal halides and are the same or different from each other;
R is a carboxyl group; and
n is an integer of 0~3.

2. The compound according to claim 1, wherein $M_1$ and $M_2$ are selected from a group consisting of nickel, tin, aluminum, magnesium, cesium, gadolinium and dysprosium.

3. The compound according to claim 2, wherein $M_1$ and $M_2$ are dysprosium.

4. The compound according to claim 2, wherein $M_1$ and $M_2$ are gadolinium.

5. The compound according to claim 2, wherein $M_1$ and $M_2$ are tin.

6. An ink composition, comprising:
a near infrared absorbent for a solar cell, wherein the near infrared absorbent is a poly cross linked phthalocyanine compound of a formula, where $M_1$ and $M_2$ are selected from the group consisting of metals, metal oxides, and metal halides and are the same or different;

$R_1$ is a carboxyl group; and n is an integer of 1~3.

* * * * *